Figure 1:
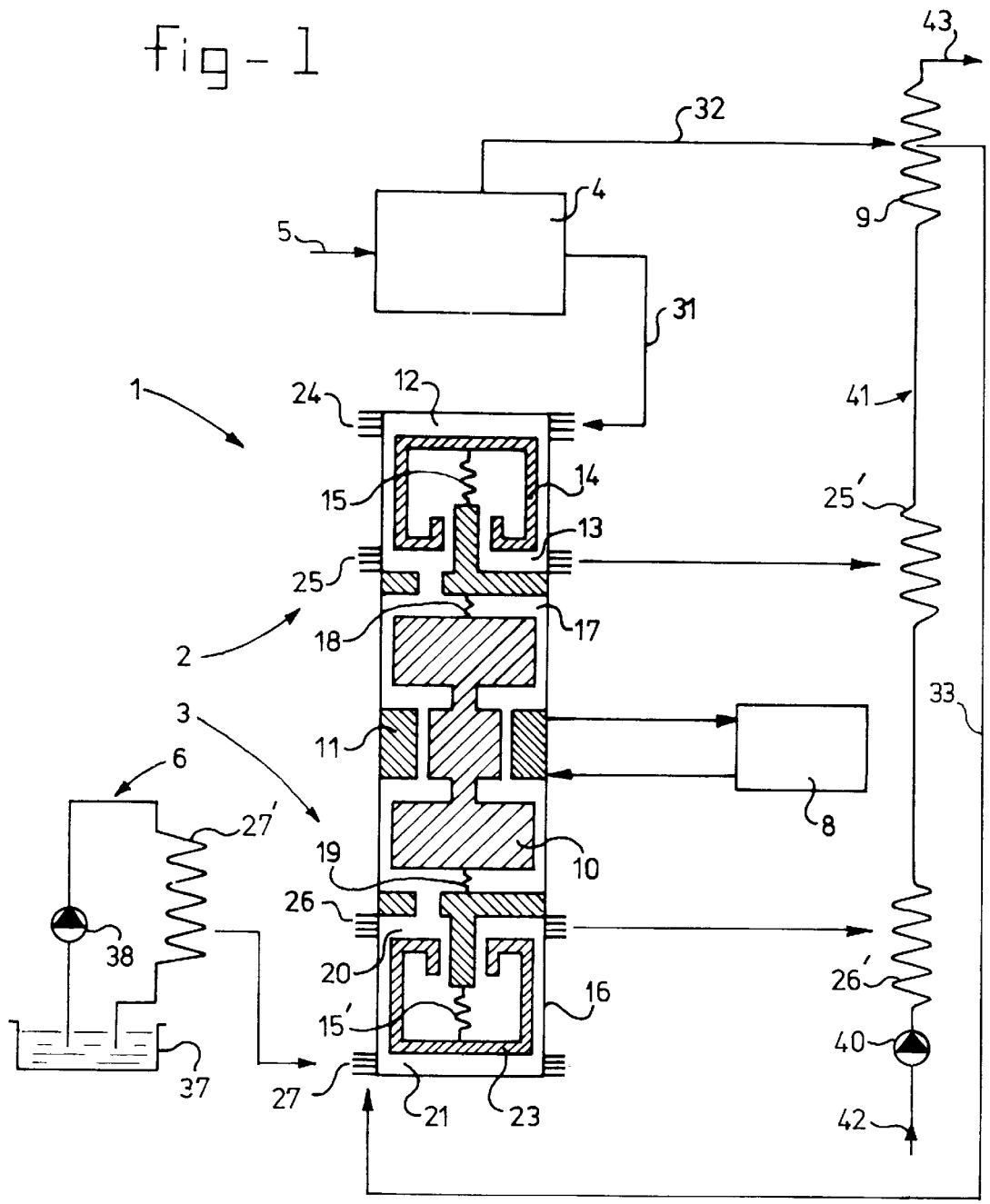

United States Patent
Veringa et al.

Patent Number: 6,151,896
Date of Patent: Nov. 28, 2000

[54] HEATING INSTALLATION BASED ON A STIRLING SYSTEM

[75] Inventors: Hubertus Johannes Veringa, Zwaag, Netherlands; Barry Penswick, Kennewick, Wash.; Johan Sjoerd Ribberink, Koedijk; Michail Aleksandrovitsj Korobitsyn, Amsterdam, both of Netherlands

[73] Assignee: Stichting Energieonderzoek Centrum Nederland, Petten, Netherlands

[21] Appl. No.: 09/355,508

[22] PCT Filed: Feb. 4, 1998

[86] PCT No.: PCT/NL98/00068

§ 371 Date: Jul. 29, 1999

§ 102(e) Date: Jul. 29, 1999

[87] PCT Pub. No.: WO98/34025

PCT Pub. Date: Aug. 6, 1998

[30] Foreign Application Priority Data

Feb. 4, 1997 [NL] Netherlands .......................... 1005182

[51] Int. Cl.⁷ .................................................... F15B 29/10
[52] U.S. Cl. ................................................. 60/524; 60/517
[58] Field of Search ........................... 60/517, 522, 524, 60/525

[56] References Cited

U.S. PATENT DOCUMENTS

| | | | |
|---|---|---|---|
| 3,458,995 | 8/1969 | Heffner et al. | ............................ 60/524 |
| 4,723,410 | 2/1988 | Otters . | |
| 4,998,460 | 3/1991 | Wolfs et al. | ......................... 60/517 X |

FOREIGN PATENT DOCUMENTS

| | | |
|---|---|---|
| 0 457 399 | 11/1961 | European Pat. Off. . |
| 0 445 510 | 9/1991 | European Pat. Off. . |
| 61-261647 | 4/1987 | Japan . |
| 7 908 316 | 6/1981 | Netherlands . |
| WO 91/05948 | 5/1991 | WIPO . |

OTHER PUBLICATIONS

J.P. Budliger, "Stirling Technology for the Home", IEA Heat Pump Centre Newsletter, vol. 13, No. 4, 1995, pp. 31–34.

*Primary Examiner*—Hoang Nguyen
*Attorney, Agent, or Firm*—Young & Thompson

[57] ABSTRACT

The present invention relates to a heating installation with a Stirling engine and Stirling-type heat pump integrated within a single pressure vessel. Two hot chambers and two cold chambers, as well as a working chamber in which a piston is mounted such that it oscillates freely, are located inside the pressure vessel. The chambers are in fluid communication with one another. A displacer is able to oscillate freely to and for between each pair of hot and cold chambers. By means of this Stirling engine of the fire piston type and the Stirling heat pump integrated therewith, a low-noise, low-maintenance and highly energy-efficient heating installation is formed which has a high net efficiency (COP value between 1.5 and 2.5). The heat from the cold chamber of the Stirling engine and from the hot chamber of the Stirling heat pump part is passed to a hot water system via a first and second heat exchanger. The heat from the exhaust gases is passed to a third heat exchanger. The heat exchangers may be connected in series or partly or wholly in parallel. Preferably the burner of the installation according to the present invention has a flat heat transfer behaviour to the Stirling engine's hot end upon increasing the power input of the burner, so that it can function as an auxiliary heater upon peak load demand.

16 Claims, 7 Drawing Sheets

EXAMPLE OF SDHP ENERGY BALANCE

COP = 1.38

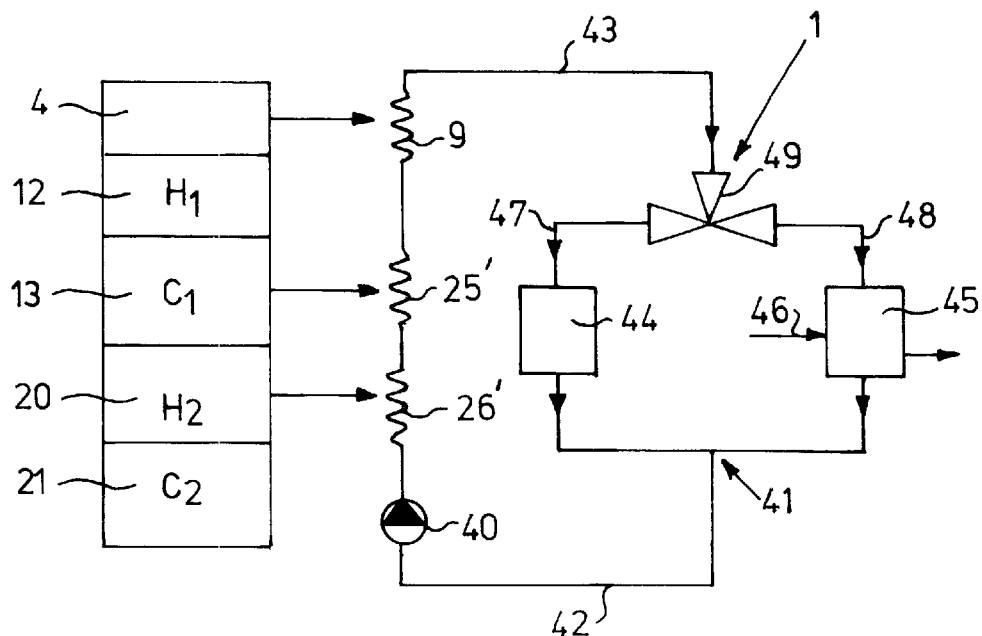
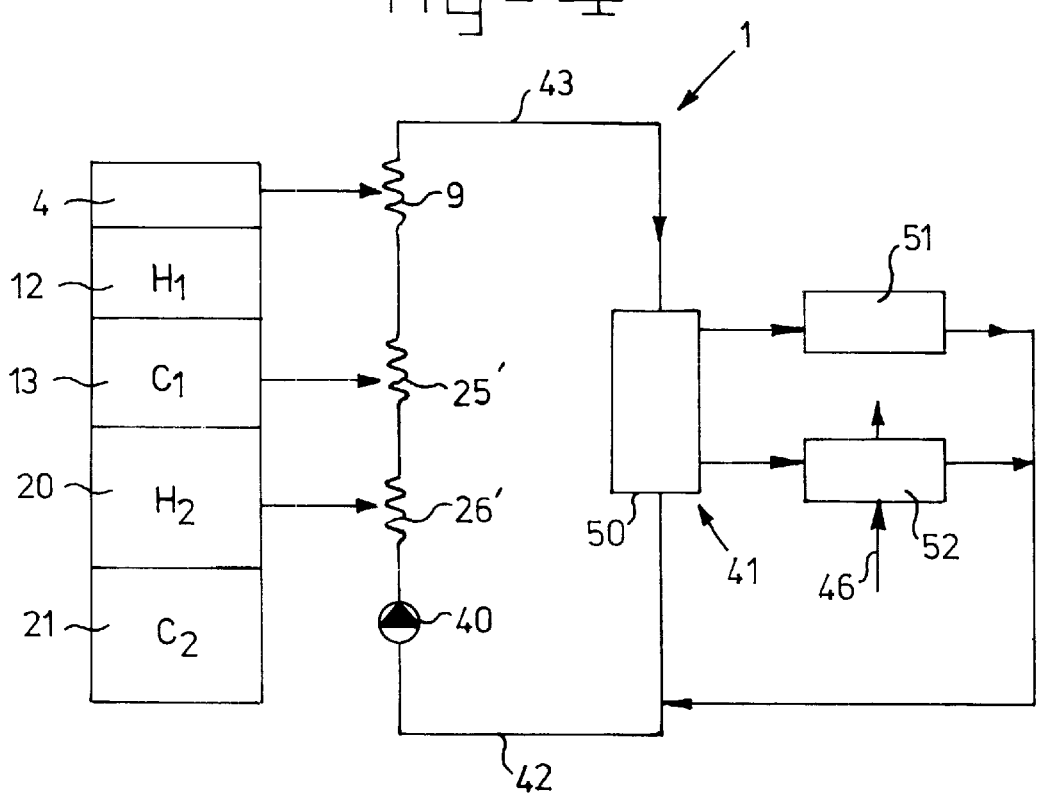

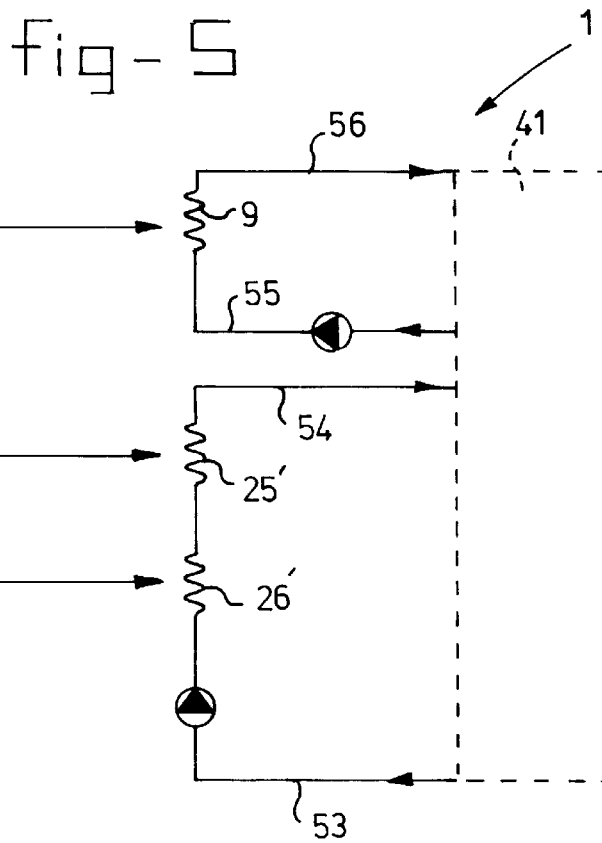
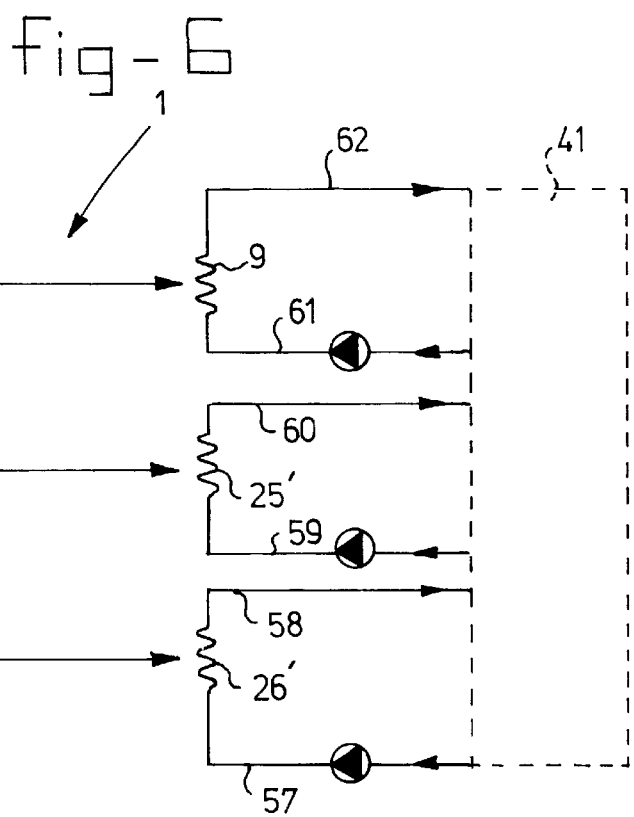

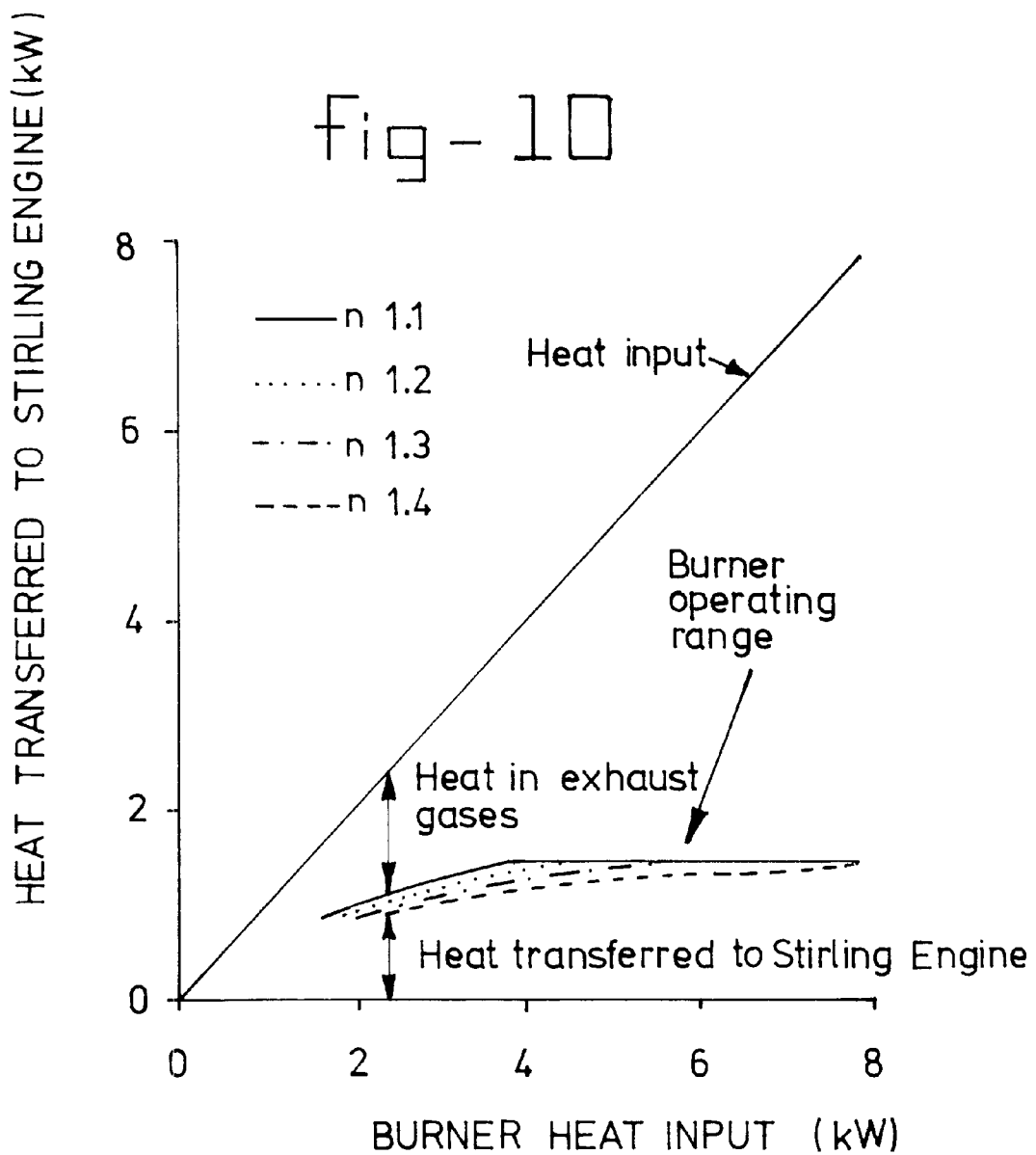

HEATING INSTALLATION BASED ON A STIRLING SYSTEM

The invention relates to a heating installation for area heating, comprising a burner and a Stirling engine thermally coupled to the burner, wherein the Stirling engine comprises a closed pressure vessel containing a working gas, the pressure vessel comprising a first hot chamber and a first cold chamber, and, adjoining the latter, a working chamber containing a piston element, as well as a second hot chamber and a second cold chamber, the hot chambers, the working chamber and the cold chambers being in fluid communication with one another, the pressure vessel being provided, at the level of the hot chambers and the cold chambers, with, in each case, an external heat exchanger, the first cold chamber and the second hot chamber being connected via their respective heat exchangers to a hot water system.

In IEA Heat Pump Centre Newsletter Vol. 13, No. 4, 1995, pages 31–34, a duplex Stirling heat pump system is described in which a free-piston Stirling engine drives a Stirling heat pump. In this system a power piston is replaced by a resonating gas column whereby the engine piston seal can be avoided. In the first hot chamber of the Stirling engine temperatures are up to 600° C.–800° C. The first cold chamber of the Stirling engine generates heat at a temperature of 40–60° C. The second cold chamber, which is the cold chamber of the Stirling heat pump draws heat from the ambient air, water or ground at temperatures between –20° C. and 20° C. which heat is ejected through the heat exchanger of the hot chamber of the Stirling heat pump at temperatures between 40 and 60° C.

European Patent Application EP-A 0 457 399 discloses a combined heat and power plant for private residences, in which a Stirling engine is used to generate electricity. The heat released by the relatively cold chamber of the Stirling engine and the hot exhaust gases are used for heating water for, for example, tap water or for heating air. A net efficiency of 85% or higher can be achieved with a system of this type.

It is an object of the present invention to provide a heating installation based on a Stirling system of the above described type wherein a high coefficient of performance can be obtained, which is easy to install and to maintain and which can be operated at various different conditions of heat demand.

Thereto a heating installation according to the present invention is characterized in that the hot water system comprises two heat exchangers coupled to the first cold chamber and the second hot chamber respectively and a third heat exchanger which is thermally coupled to the exhaust gases of the burner.

By heating the cold water through the heat exchangers, including heat exchange with the exhaust gases, a high coefficient of performance can be obtained. The coefficient of performance, or "COP" is defined herein as the total heat produced by the complete system divided by the enthalpy of the input fuel.

In one embodiment, the three heat exchangers are connected in series, the cold water being successively heated to increasingly high temperatures. When the cold water arrives at the first heat exchanger that is connected to the hot chamber of the Stirling heat pump, with a temperature of 60° C. and leaves the heat exchanger of the exhaust gases with a temperature of 80° C., a COP of 1.38 can be obtained. The system wherein cold water arrives at the first heat exchanger with a temperature of 10° C. and leaves the heat exchanger of the exhaust gases at a temperature of 60° C. has a COP of 1.72. In this latter case the exhaust gasses are condensed to only a minor extent. However, as the temperature lift of the Stirling heat pump is relatively small, the overall efficiency is increased.

Since the COP values of the Stirling heat pump are less sensitive for thermal conditions of the external heat source than electric heat pumps, integration of the Stirling engine and the Stirling heat pump will give the possibility to maximize the overall system COP. This is achieved by balancing the integration of the Stirling driven heat pump with the heat exchangers to give optimal system COP's, much higher than what is achieved with electric heat pumps.

The hot water output from the heat exchanger of the exhaust gases can be coupled directly to a separate central heating system and a hot tap water supply wherein the Stirling engine and the Stirling heat pump function in an intermittent way. It is also possible that the hot water output is connected to a storage tank which supplies hot water to both a central heating system and a tap water supply, the Stirling engine and the Stirling heat pump being operated continuously. The operational conditions are readily optimized by simple interconnection of the various heat exchangers and accommodation of a heat storage. It is found that already a small storage (100 liter water) has a significant impact on the peak load function and related overall system COP.

An other embodiment of a heating installation according to the present invention is characterized in that the hot water system comprises a series connection of two heat exchangers having a first cold water inlet upstream from the heat exchanger of the second hot chamber and a first hot water outlet downstream from the heat exchanger of the first cold chamber and comprising a second cold water inlet and a second cold water outlet connected to the heat exchanger of the exhaust gases. In this configuration the separate cold water supply to the heat exchanger of the exhaust gasses ensures that a larger extent of condensation of the exhaust gasses can be achieved in order to obtain a higher COP-value.

An other embodiment of a heating installation according to the present invention is characterized in that the hot water system comprises three cold water inlets and three hot water outlets each connected to a respective heat exchanger which are placed in a mutually parallel configuration. This system has as an advantage that it has a high flexibility, as hot water can be supplied at three different temperature levels, for instance for floor heating, hot tap water and a high temperature central heating system, as well as non-household applications.

In a preferred embodiment the exhaust gasses are passed via the heat exchanger of the exhaust gasses to the heat exchanger of the second cold chamber. By direct heating of the second cold chamber or by supplying heat to the external flow that supplies heat to the second cold chamber, less heat has to be drawn from the environment by the Stirling heat pump. Thereby the heat exchanger with the environment can be considerably decreased in size such that a large cost reduction can be obtained hereby. Since a major part of heat production is due to the combustion of gas, the external heat exchanger of the Stirling heat pump is significantly smaller than the heat exchanger required for an electric heat pump.

In a further preferred embodiment of the heating installation according to the present invention the burner comprises a region of substantially constant heat transfer to the first hot chamber. The radiation gas burner is chosen in such a way that it serves the function of heat delivery to the Stirling heat pump system as well as peak load heat supply.

The burner preferably comprises a radiant burner such as a ceramic burner available from ECO Ceramics or a metal fibre burner. Burners of for instance the ceramic radiation type, transmit a large part of their heat by radiation from the glowing burner surface. The radiation heat transfer has a maximum at a specific power of about 300–400 kW/m². For power outputs above this value the radiative contribution to the heat transfer decreases and the convective part is increased. In this transition region between radiation heat transfer and convection heat transfer, the heat transfer characteristic is made flat by proper control of the amount of excess air in the burner. By using a burner with a constant power output to the first hot chamber of the Stirling engine, the burner can efficiently be operated as an auxiliary heater while operating the Stirling engine at a constant power. When peak load is required, the power input of the burner is increased, and the temperature of the exhaust gasses will rise as a consequence. Via the heat exchanger of the exhaust gasses, the heat can be transmitted to the hot water supply while the combined Stirling engine and Stirling heat pump, which for instance drive a central heating system, can be maintained at a constant power output.

The heating installation according to the present invention may comprise thermally conducting connecting means for connecting the second hot chamber and the second cold chamber to turn off the heat pump function for co-generation purposes. The system can operate as a micro co-generation unit when an electrical generator is accommodated. This is without high costs achieved while the heat pump function is turned off by short cutting the heat in-and output of the Stirling heat pump. In the same way the system can operate as an electrically driven heat pump while the engine can be given different functions like, for example, cooling.

Figure 2:
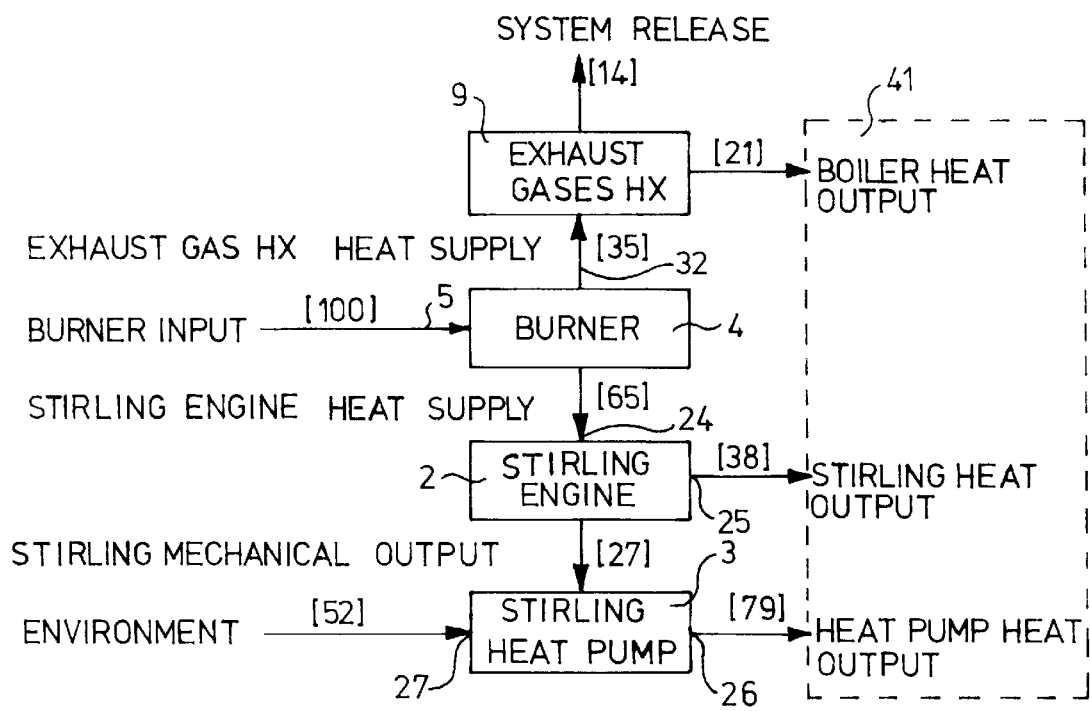
Figure 7:
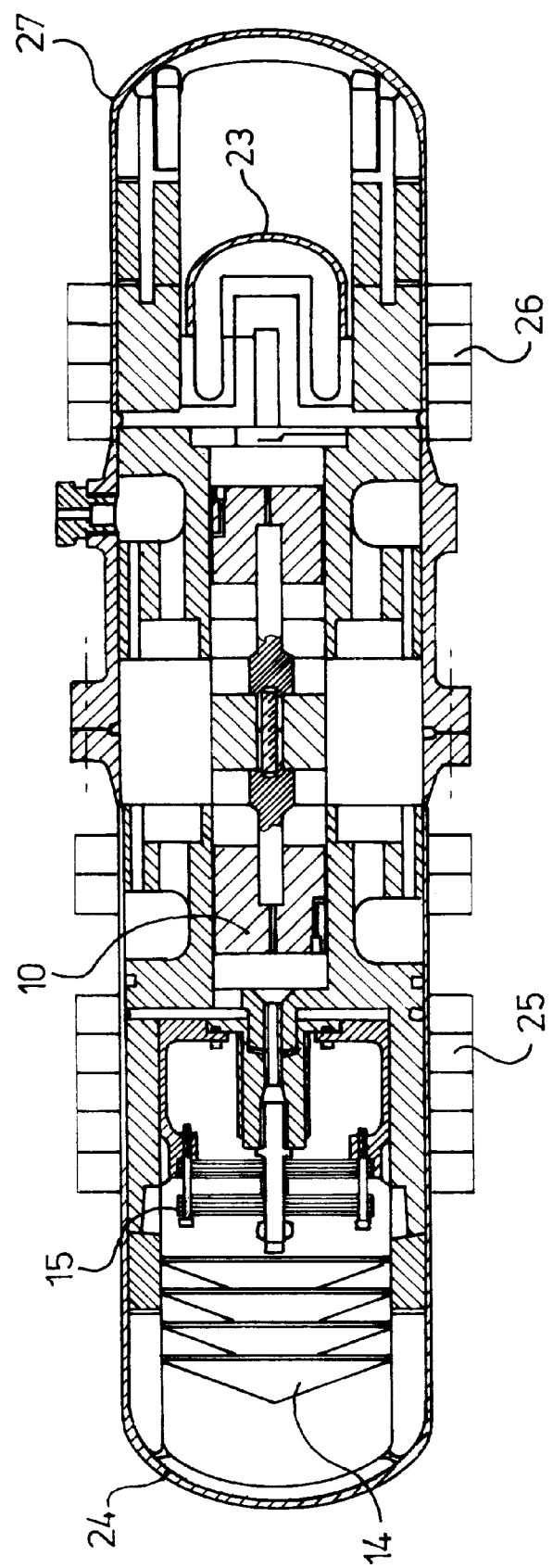
Figure 8:
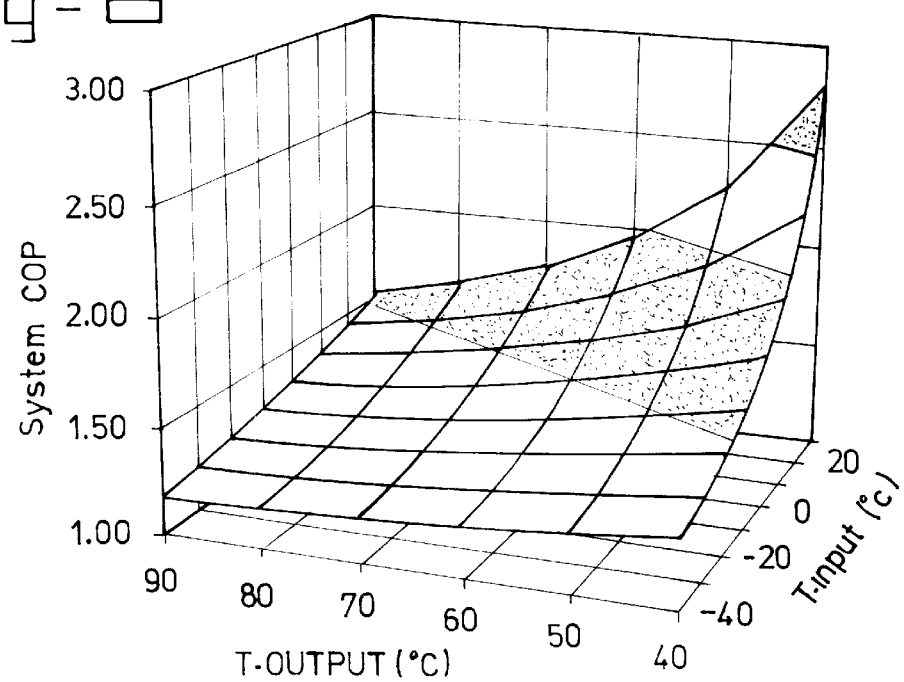
Figure 9:
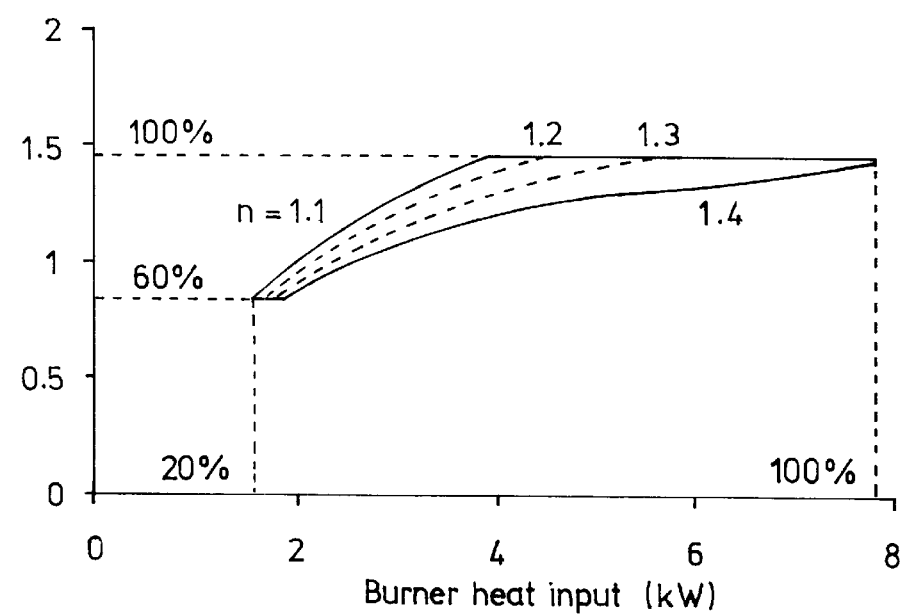

Embodiments of the heating installation according to the present invention will be explained in detail with reference to the accompanying drawings. In the drawings:

FIG. 1 shows, diagrammatically, a first embodiment of a heating installation according to the present invention, FIG. 2 schematically shows the heat input and output of a combined Stirling engine-Stirling heat pump according to the present invention and the corresponding COP-value, FIGS. 3 and 4 show embodiments of a heating installation comprising three heat exchangers in a series connection, FIG. 5 shows a configuration of a heating installation having two heat exchangers in series connection, parallel to a third heat exchanger, FIG. 6 shows an embodiment wherein three heat exchangers are used in parallel, FIG. 7 shows a cross-sectional view of an integral Stirling engine and Stirling heat pump for use in the installation according to the present invention, FIG. 8 shows a graph of the net efficiency of the system according to the present invention as a function of the temperature of the cold chamber and the hot chamber of the Stirling heat pump, and FIGS. 9 and 10 show graphs of the heat transferred by a ceramic burner to the Stirling motor versus the burner heat input.

FIG. 1 shows a heating installation 1 according to the present invention. The heating installation 1 comprises a Stirling engine component 2 with a Stirling heat pump 3 integral therewith. Heat is supplied to the Stirling motor component 2 via a burner 4. The burner 4 may comprise a natural gas burner, having a gas inlet 5. The heat released by the Stirling engine component 2 is fed via a heat exchanger 25,25' to a hot water system 41, such as, for example, a central heating installation or a hot water system for tap water. A relatively cool fluid is passed along the cold chamber 21 of the Stirling heat pump 3 from a cold environment 6 via a heat exchanger 27,27'. At the hot chamber 20 of the Stirling heat pump 3, heat is transferred to the hot water system 41 via a heat exchanger 26,26'. The exhaust gases from the burner 4 are transferred, as schematically indicated at 32, to a heat exchanger 9 of the hot water system 41. After having heated up the water in the heat exchanger 9, the cooled exhaust gases may be forwarded to the heat exchanger 27, or 27' of the cold chamber 21 of the Stirling heat pump 3 along a duct 33.

In the embodiment shown in FIG. 1 the hot water system 41 comprises a cold water inlet 42 and three heat exchangers 9,25',26' connected in series. The cold water is transported from the inlet 42 through the heat exchangers 26',25' and 9 via a pump 40 to be successively increased in temperature for instance from 10° C. at the inlet 42 to 60° C. at the outlet 43.

The Stirling engine component 2 as shown in FIG. 1 comprises a piston 10 which in the embodiment shown forms part of an AC generator 11. Via said AC generator electric power can be supplied to domestic appliances or to an electricity mains 8. Electric energy can also be supplied from an electricity mains 8 to the AC generator 11 to drive the piston 10 and in this way to operate the Stirling heat pump 3 when the Stirling engine component 2 itself is not being driven.

The Stirling engine component 2 comprises a first hot chamber 12 and a first cold chamber 13. A displacer 14 is accommodated inside a pressure vessel 16 such that it can oscillate freely via a spring element 15. The first cold chamber 13 is in fluid communication with a working chamber 17, in which the piston 10 is suspended such that it is movable to and fro. The piston 10 is connected by means of spring elements 18, 19 to the pressure vessel 16. The working chamber 17 is in fluid communication with a second hot chamber 20 and a second cold chamber 21 of the Stirling heat pump 3. With the aid of a second displacer 23, which is connected to a spring element 15', the working gas in the pressure vessel 16 can be moved to and fro between the second hot chamber 20 and the second cold chamber 21.

The piston 10 is brought into oscillation by expansion and compression of the working gas and the free oscillation of the displacer 14 which moves the working gas between the cold chamber 13 and the hot chamber 12. The displacer 14 and the piston 10 are coupled by means of the working gas, with a phase difference such that a Stirling cycle is completed.

The piston 10 also forms part of the Stirling heat pump 3, which is also accommodated inside the pressure vessel 16. The Stirling heat pump 3 is essentially of the same construction as the Stirling engine component 2. Although this is shown diagrammatically in FIG. 1, the Stirling heat pump 3 does not, however, have to be identical to the Stirling engine component 2.

Heat exchangers 24, 25, 26 and 27 are mounted on the outer periphery of the pressure vessel 16 at the level of each hot and cold chamber 12, 13, 20, 21. The first heat exchanger 24 is connected to the burner 4, via the heat-conducting path 31, which is indicated diagrammatically only. Via the heat exchanger 24, the working gas in the first hot chamber 12 is brought to a temperature of about 400° C.–800° C. In the first cold chamber 13, the working gas inside the pressure vessel 16 is at a temperature of about 90° C. Via the heat exchangers 25,25' this heat is transferred to the hot water system 41. The hot water system 41 can comprise a closed circuit containing the circulation pump 40 and a number of radiator or convector elements. A heat buffer can also be incorporated in the form of an insulated storage reservoir.

The hot water system 41 can also constitute a tap water supply or can comprise a combination of such a tap water supply integrated with the heating system for the area to be heated.

A relatively cool fluid from a cool environment 6 is supplied, via the heat exchanger 27, which is shown diagrammatically, to the second cold chamber 21 of the Stirling heat pump 3. The external heat source can for example, be a reservoir of liquid 37, which, for example, can be a ditch, a lake, a river and the like. The water from the external heat source is circulated via a pump 38 over the heat exchanger 27' to heat up the second cold chamber 21. The water is at a temperature of between −20° C. and 20° C., preferably as high as possible. Instead of water or another liquid, it is also possible to pass relatively cool ambient air along the heat exchanger 27.

The power of the Stirling engine-Stirling heat pump 2, 3 can be about 1 kW. The power of the burner 4 is about 8 kW. The working gas used in the pressure vessel 16 is, for example, helium under a pressure of 50 bar.

FIG. 2 shows the energy balance of the Stirling engine-Stirling heat pump combination according to the present invention. In FIG. 2 the same reference numerals have been used for the same components as shown in FIG. 1. The energy values of the heat flows have been indicated between square brackets. The input energy supplied to the burner 4 is set at 100. From calculations it has appeared that about one third of the heat is supplied by the environment via heat exchanger 27 (52/(100+52)). The total heat output amounts to 138 (21+38+79). Therefore the COP (coefficient of performance) is 1.38. In this calculation it is assumed that the exhaust gases of the burner 4 are supplied via the exhaust 32 to the hot water system 41 at a temperature of 700° C. The heat in the exhaust gases can not be completely utilized because condensation is not as the temperature of the incoming water in heat exchanger 9 is above the dew-point of the exhaust gas.

At the heat exchanger 25 of the Stirling engine 2, temperatures amount to about 80° C. The heat exchanger 26 of the Stirling heat pump 3 has a similar or lower temperature as the heat exchanger 25.

FIG. 1 and FIG. 3 through 6 show examples of possible integration schemes of the Stirling driven heat pump and heat exchangers for heat delivery to and from the environment.

FIG. 3 shows a configuration in which the hot water system comprises three heat exchangers 9,25',26' which are connected in series. Hot water is supplied to the first heat exchanger 26' via a pump 40 and leaves the heat exchanger 9 via a hot water outlet 43. The heat exchanger 9 is thermally coupled to the exhaust gases of the burner 4. The heat exchanger 25' is connected to the first cold chamber 13 of the Stirling engine part. The heat exchanger 26' is connected to the second hot chamber 20 of the Stirling heat pump part. The hot water may be supplied via a valve 49 and a first branching duct 47 to a central heating system 44. Via a second branching duct 48 the hot water may be supplied to a hot tap water supply 45 which may comprise a storage tank. When water is taken out of the hot water supply 45, the supply 45 is refilled with cold water via a duct 46. In this embodiment, the Stirling engine and Stirling heat pump will work intermittently. Preferably the burner 4 in this embodiment is executed as a burner having a flat heat transfer characteristic to the first hot chamber 12 of the Stirling engine as will be explained hereafter. Such a burner is particularly suitable to function as an auxiliary heater while maintaining a constant operation of the Stirling engine-Stirling heat pump combination. Because of the higher use of the burner 4 as an auxiliary heater for hot water production, the overall COP value of this system will be somewhat lower as the system which is discussed with reference to FIG. 4. Using a storage system for hot water which is connected both to the central heating system and the hot water supply is favourable with respect to the COP wherein a optimal amount of hot water storage is between 500 and 1000 litres but smaller volumes also have a high impact on the system's COP. The system can be further optimized for combined operation with a thermal solar collector.

In an alternative embodiment as shown in FIG. 4, the hot water outlet 43 is connected to a storage tank 50. A central heating device 51 and a hot water supply 52 are both connected to the storage tank 50. Upon drawing water from the tank 50 by the hot water supply 52, cold water is introduced into the system via a cold water supply duct 46.

The system according to FIGS. 3 and 4 is of a relatively simple construction as the cool water passes through all heat exchangers in series wherein the water is heated up in stages. The exhaust gases leave the system at a temperature of about 65° C., which is above dew-point, to the ambient air. This represents a loss factor.

Table 1 shows the performance of the systems of FIGS. 3 and 4 based on heat balance calculations wherein the burner energy input has been set to 100. The hot water system in table 1 corresponds to either central heating system 44 and hot water supply 45 in FIG. 3 or to the storage tank 50 in FIG. 4. The first row represents the temperatures at the hot water outlet 43 and the cold water inlet 42 respectively. It appears from table 1 that the highest COP value of 1.91 is obtained when the cold water inlet temperature amounts to 30° C. and the hot water outlet temperature is 40° C. For a high temperature system in which the cold water inlet temperature is 60° C. and the hot water outlet temperature is 80° C. the overall COP amounts to 1.38. For tap water heating, wherein the cold water inlet temperature amounts to 10° C. and the hot water outlet temperature amounts to 60° C., the COP is 1.72. In the last 2 rows of table 1, a comparison is made with a conventional high efficiency system as known in the state of the art under the same conditions, so also taking into account a limited or absent condensation. It appears that the COP values of the system according to the present invention are between 60% and 107% higher than COP values that can be obtained with prior art systems.

TABLE 1

|  | 80/60 | 60/40 | 40/30 | 60/10 |
| --- | --- | --- | --- | --- |
| Burner input | 100 | 100 | 100 | 100 |
| hot water system heat supply | 35 | 35 | 35 | 35 |
| hot water system heat output | 21 | 22 | 27 | 22 |
| overall system release | 14 | 13 | 8 | 13 |
| Stirling heat supply | 65 | 65 | 65 | 65 |
| Stirling heat output | 38 | 37 | 37 | 37 |
| Stirling mechanical output | 27 | 28 | 28 | 28 |
| Heat Pump input from environment | 52 | 71 | 99 | 84 |
| Heat Pump output | 79 | 98 | 127 | 112 |
| Overall COP | 1.38 | 1.58 | 1.91 | 1.72 |
| COP reference system | 0.86 | 0.87 | 0.92 | 0.87 |
| Increase in COP (%) | 60 | 81 | 107 | 97 |

FIG. 5 shows an embodiment wherein two heat exchangers 25',26' are connected in series and have a cold water inlet 53 and a hot water outlet 54. The heat exchanger 9 for the exhaust gases comprises a separate cold water inlet 55 and hot water outlet 56. The hot water system 41 comprising this configuration of heat exchangers has a performance as shown in table 2. It would be expected that the relative cool water in heat exchanger 9 would cause a better condensation of the exhaust gases and hence an improved heat exchange from these gases. As shown by the calculations of table 2, it appears however that the performance of the system of FIG. 5 is comparable to that of FIGS. 3 and 4. This may be caused by a higher temperature difference between the hot chamber 20 and cold chamber 21 of the Stirling heat pump, which decreases the efficiency of this component. In table 2 the temperatures at the cold water inlets 53,55 and at the hot water outlets 54,56 are the same.

TABLE 2

|  | 80/60 | 60/40 | 40/30 | 60/10 |
| --- | --- | --- | --- | --- |
| Burner input | 100 | 100 | 100 | 100 |
| Hot water system heat supply | 35 | 35 | 35 | 35 |
| Hot water system heat output | 22 | 26 | 30 | 33 |
| Overall system release | 13 | 9 | 5 | 2 |
| Stirling heat supply | 65 | 65 | 65 | 65 |
| Stirling heat output | 38 | 37 | 37 | 37 |
| Stirling mechanical output | 27 | 28 | 28 | 28 |
| Heat Pump input from environment | 50 | 68 | 96 | 77 |
| Heat Pump output | 77 | 96 | 125 | 105 |
| Overall COP | 1.37 | 1.59 | 1.91 | 1.75 |
| COP reference system | 0.87 | 0.91 | 0.95 | 0.98 |
| Increase in COP (%) | 58 | 75 | 101 | 79 |

In the embodiment of FIG. 6 the heat exchangers 9,25', 26' of the hot water system 41 are each connected in parallel. By this system water at different temperatures can be supplied by each heat exchanger. The heat exchanger 26' can for instance be connected to an area heater operating at a temperature of about 50° C. such as a central heating system or an air convection heating system. The heat exchanger 25' can be used for tap water heating at a temperature of about 60° C. The hot water from the heat exchanger 9 may be selectively supplied to either the system of the heat exchanger 25' or the system of the heat exchanger 26' depending on hot water demand.

Table 3 finally shows the performance of an embodiment of a hot water system as shown in FIG. 1, in which the exhaust gases after passing along heat exchanger 9 are passed via a duct 33 through the heat exchanger 27 or 27' of the cold chamber 21 of the Stirling heat pump 3. As shown in FIG. 2, the limited condensation of the exhaust gases leads to 14% of the heat content of the exhaust gases not being used. In the embodiment of FIG. 1, the idea has been to use the remaining heat of the exhaust gasses for an increase in temperature of the incoming heat flow to the Stirling heat pump 3. Hereby the temperature difference across the Stirling heat pump is decreased and the efficiency is increased. In calculating the figures that are given in table 3, it was found however that this gain in efficiency is relatively small since the incoming heat flow at the heat pump is increased from 10° C. to 12° C. Only for the 60/10 case this is somewhat higher. Even though the effect on the COP is small, the use of the heat from the exhaust gasses at the heat exchanger 27 has a large effect on the costs, as the heat exchanger 27 can be largely reduced in size. If the water temperature at the heat exchanger 27 can be increased with 2° C., it is for the calculations in table 3 only necessary to extract 8° C. from the environment instead of 10° C. The gain in efficiency is exchanged for a substantial reduction in size of the external heat exchanger.

TABLE 3

|  | 80/60 | 60/40 | 40/30 | 60/10 |
| --- | --- | --- | --- | --- |
| Burner input | 100 | 100 | 100 | 100 |
| Hot water system heat supply | 35 | 35 | 35 | 35 |
| Hot water heat output | 21 | 22 | 27 | 22 |
| Overall system release | 14 | 13 | 8 | 13 |
| Stirling heat supply | 65 | 65 | 65 | 65 |
| Stirling heat output | 38 | 37 | 37 | 37 |
| Stirling mechanical output | 27 | 28 | 28 | 28 |
| Heat pump input from environment | 54 | 73 | 101 | 88 |
| Heat pump output | 81 | 101 | 129 | 115 |
| Overall COP | 1.40 | 1.60 | 1.93 | 1.75 |
| COP reference system | 0.86 | 0.87 | 0.92 | 0.87 |
| Increase in COP (%) | 63 | 84 | 110 | 101 |

FIG. 7 shows in more detail a longitudinal cross-sectional view of an integral Stirling motor and Stirling heat pump which is suitable for use in a heating installation according to the present invention. In this FIG. identical components are indicated by the same reference numerals as used in FIG. 1.

FIG. 8 shows a graph of the net efficiency of the heating system, or the "coefficient of performance" (COP), as a function of the temperature at the heat exchanger 27 of the cold chamber 21 of the Stirling heat pump 3, $T_{input}$, and the temperature of the hot water outlet 43, 54 or 56, $T_{output}$. The figures that are given in Table 1 through Table 3 can be found in FIG. 8.

FIG. 9 shows the graph of the heat transfer from the burner 4 to the Stirling engine 2 as a function of the burner heat input. The burner 4 preferably comprises a radiation burner such as a ceramic burner available from ECO Ceramics. In FIG. 9 the parameter n is the air number which equals 1 plus the fraction of excess air in the burner. It can be seen that for the burner according to the present invention the heat transfer rises from 60% to the maximal 100% heat transfer upon increasing the burner heat input from about 1.6 to about 4 kW. By controlling the amount of excess air, or varying the parameter n, the heat transfer can be kept constant at a burner input between 4 and 8 kW.

As shown in FIG. 10 the burner can be used as an auxiliary burner during periods of high heat demand for instance for hot tap water. During increase of the burner heat input, the heat transfer to the Stirling engine is kept constant while the rest of the heat is passed through the exhaust gasses and through heat exchanger 9 directly to the hot water system 41.

What is claimed is:

1. Heating installation (1) for area heating, comprising a burner (4) and a Stirling engine (2) thermally coupled to the burner (4), wherein the Stirling engine (2) comprises a closed pressure vessel (16) containing a working gas, the pressure vessel (16) comprising a first hot chamber (12) and a first cold chamber (13), and, adjoining the latter, a working chamber (17) containing a piston element (10), as well as a Stirling heat pump (3) comprising a second hot chamber (20) and a second cold chamber (21), the hot chambers (12, 20), the working chamber (17) and the cold chambers (13, 21) being in fluid communication with one another, the pressure vessel (16) being provided, at the level of the hot chambers (12, 20) and the cold chambers (13, 21), with, in each case, an external heat exchanger (24, 25, 26, 27), the first cold chamber (13) and the second hot chamber (20) being connected via their respective heat exchangers (25,26) to a hot water system (41) characterised in that the hot water system (41) comprises two heat exchangers (25,25',26,26') coupled to the first cold chamber (13) and the second hot chamber (20) respectively and a third heat exchanger (9) which is thermally coupled to the exhaust gases of the burner (4).

2. Heating installation (1) according to claim 1, characterised in that the hot water system (41) comprises a series connection of the two heat exchanges (25,25',26,26') having a cold water inlet (42) upstream from one of the heat exchangers (25',26') and a hot water outlet (43) downstream from the heat exchanger (9) of the exhaust gases.

3. Heating installation (1) according to claim 1, characterised in that, the heating system (41) comprises a central heating device (44) and a hot water supply (45) that are each connected with a respective inlet to the hot water outlet (43) via a branching connection (47,48) and a valve (49), and that are with their outlets connected to the cold water inlet (42).

4. Heating installation (1) according to claim 1, characterised in that, the heating system (41) comprises a storage tank (50) connected between the hot water outlet (43) and the cold water inlet (42) which is connected to a hot water supply (52) and to a central heating device (51).

5. Heating installation (1) according to claim 1, characterised in that the hot water system (41) comprises a series connection of the heat exchangers (25,25',26,26') of the first cold chamber (13) and the second hot chamber (20) having a first cold water inlet (53) upstream from the heat exchanger (26') with the second hot chamber (20) and a first hot water outlet (54) downstream from the heat exchanger (25') with the first cold chamber (13) and comprising a second cold water inlet (55) and a second hot water outlet (56) connected to the heat exchanger (9) of the exhaust gases, or comprising a series connection of one of the heat exchangers (25,25';26,26') and the heat exchanger (9) of the exhaust gases having a first cold water inlet upstream from one of the heat exchangers (25,25'26,26') and a first hot water outlet downstream from the heat exchanger (9) of the exhaust gases, and a second cold water inlet and hot water outlet located upstream and downstream respectively from the other of the heat exchangers (25,25';26,26').

6. Heating installation (1) according to claim 1, characterised in that the hot water system (41) comprises three cold water inlets (57,59,61) and three hot water outlets (58,60,62) each connected to a respective heat exchanger (9,25',26') which are placed in a mutually parallel configuration.

7. Heating installation (1) according to claim 1, characterised in that, the exhaust gases are passed via the heat exchanger (9) of the exhaust gases to the heat exchanger (27,27') of the second cold chamber (21).

8. Heating installation (1) according to any of claim 1, characterised in that, the burner (4) comprises a region of substantially constant heat transfer to the first hot chamber (12).

9. Heating installation (1) according to claim 8, wherein during peak load, the power input to the burner (4) can be increased while maintaining a constant heat output to the first hot chamber (12).

10. Heating installation (1) according to claim 8, characterised in that, the burner (4) comprises a radiant gas burner.

11. Heating installation (1) claim 1, characterised in that the piston element (10) is connected to a generator (11) located inside the pressure vessel (16), with connection terminals, located outside the pressure vessel, for connection to an electricity mains for the generation of electricity and supply to the mains and for supply from the mains to the generator.

12. Heating installation (1) according to claim 11, characterised in that, the installation comprises thermally conducting connecting means for connecting the second hot chamber (20) and the second cold chamber (21) to turn off the heat pump function for co-generation purposes.

13. Heating installation (1) according to claim 1, characterised in that the pressure vessel (16) is completely closed and has no components extending through the wall thereof.

14. Heating installation (1) according to claim 1, characterised in that the temperature of the first hot chamber (12) is between 300° C. and 800° C., in that the temperature of the first cold chamber (13) is between 50° C. and 150° C., in that the temperature of the second hot chamber (20) is between 20° C. and 90° C. and in that the temperature of the second cold chamber (21) is between −30° C. and 30° C.

15. Heating installation (1) according to claim 1, characterised in that the piston element (10) is connected by means of a spring element (18, 19) to the pressure vessel (16).

16. Heating installation (1) according to claim 1, characterised in that a displacer (14, 23) is accommodated in, respectively, the first hot and cold chambers and the second hot and cold chambers, which displacers are each connected by a spring element (15, 15') to the pressure vessel (16), which displacers (14, 23) are not rigidly coupled to the piston element (10).

* * * * *